Oct. 23, 1956 E. J. STACHURA 2,768,250

DIRECT COUPLED AMPLIFIER

Filed Sept. 17, 1951

INVENTOR.

Edward J. Stachura

United States Patent Office 2,768,250

Patented Oct. 23, 1956

2,768,250

DIRECT COUPLED AMPLIFIER

Edward J. Stachura, Arlington, Va.

Application September 17, 1951, Serial No. 247,014

6 Claims. (Cl. 179—171)

(Granted under Title 35, U. S. Code (1952), sec. 266)

The invention described herein may be manufactured and used by and for the Government for governmental purposes, without the payment to me of any royalty thereon.

This application is a continuation in part of my co-pending application, Serial Number 95,131, filed May 24, 1949 and now abandoned, for Direct Coupled Amplifier.

The present invention relates to electron discharge tube circuits and particularly to amplifier circuits.

The principal object of the invention is to provide an amplifier which may be used for the amplification of direct current or alternating current signal inputs.

A further object of this invention is to provide a novel push pull amplifier which has a substantially higher voltage gain than push pull amplifiers of the conventional type.

A feature of the invention relates to a push pull amplifier wherein anode circuit of the tubes of a preceding stage are connected in the direct current grid-return circuit of the following stage, and wherein all tubes receive their anode potential from one source of supply through the utilization of a novel interstage coupling arrangement.

Other objects, features and advantages of this invention not specifically enumerated will suggest themselves to those skilled in the art and will become apparent from the following detailed specification taken in conjunction with the accompanying drawings in which.

Figure 1:
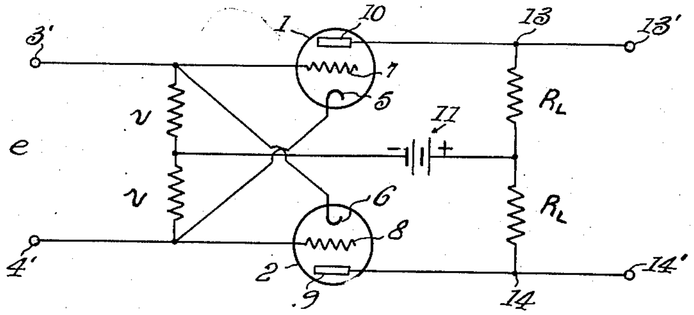
Figure 1 shows an amplifier arrangement of the prior art.

Referring more particularly to Figure 1, the circuit shown is an amplifier arrangement of the prior art which was first disclosed in British Patent No. 542,035, dated December 23, 1941, to Baird. Since improvements and modifications of this circuit for use in multistage amplifiers are the subject of the present invention, a somewhat detailed description of the circuit of Figure 1 will be given.

The circuit of Figure 1 utilizes two amplifier tubes 1 and 2. The tubes shown are of the triode type but may be of any well known multi grid types. Grid 7 of tube 1 is connected to the cathode 6 of tube 2 and to one side 4 of input resistor *r*; grid 8 of tube 2 is connected to the cathode 5 of tube 1 and to the other side 3 of resistor *r*. Resistor *r* may comprise two equal resistors in series connection between points 3 and 4, or may be of a potentiometer type wherein the center point 12 would be connected to the slider of the potentiometer. Center point 12 is connected to the negative terminal of a source of direct current potential 11. Two resistors $R_L$ are connected in series between the anodes 9 and 10 and have their midpoint 15 connected to the positive terminal of the source of supply. In operation, an input signal $e_g$ is supplied to terminals 3′ and 4′, and the output signal is obtained from across terminals 13′ and 14′. A suitable ground connection may be made to point 12 of the circuit of Figure 1.

When no signal is applied to the terminals 3′ and 4′ of Figure 1, a direct current will flow from anode 10 of tube 1, through $R_L$ from 13 to 15, to point 12, through *r* to 4 and to the cathode 5 of tube 1 to complete its circuit. Similarly, a second current will flow from anode 9 of tube 2 through $R_L$ from 14 to 15, to 12, through *r* to point 3 and to cathode 6 of tube 2. Because the circuit of Figure 1 is symmetrical, the two anode currents will be of equal magnitude. Further, due to the noval manner in which the grid resistors *r* are connected, the anode current flowing through the two sections of *r* will be in opposite directions, producing potential drops across each section which causes points 3 and 4 to be positive by equal amounts relative to the midpoint 12, and no potential difference, under zero signal conditions, will be found to exist between points 3 and 4. When equal anode currents flowing through resistors $R_L$, no voltage will appear across terminals 13′ and 14′ since only the difference in voltage drops will appear at these terminals.

In the operation of the above described circuit, when a signal voltage is applied to the input terminals 3′ and 4′, the balance which existed under no signal conditions is disturbed and an output voltage appears at terminals 13′ and 14′. The signal $e_g$ in Figure 1 is applied directly to the grid cathode of tubes 1 and 2. Thus with a positive voltage applied to grid 7 with respect to its cathode 5, an equal negative voltage is applied to grid 8 with respect to its cathode 6. Under these conditions the anode current of tube 1 increases and the anode current of tube 2 decreases producing unequal potential drops across the two sections of $R_L$ with the result that a differential potential will be present between the terminals 13′ and 14′. The change in anode current further unbalances the input circuit by producing unequal drops across the two parts of input resistor *r*. At first glance the change in potential across *r* due to the changing anode currents appears to be in opposition to the input signal, however, due to the push pull action of the currents in the two parts of the input resistors, insofar as the effects of anode current are concerned, only a slight degenerative effect on the overall amplification of the circuit is produced. This will become apparent as the description proceeds. The degenerative effect of anode current flow through the input resistors is more than overcome by the fact that the input signal $e_g$ is applied with full effect on each tube. In conventional push pull arrangements only half of the input signal is utilized to excite the grid circuit of each tube.

Figure 2:
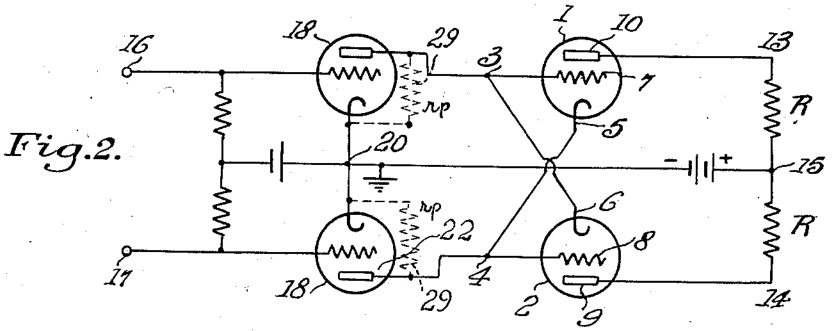
Figure 2 shows an amplifier in accordance with the invention.

Figure 2 illustrates a two stage push pull amplifier in accordance with the invention. Anodes 21 and 22 of tubes 18 and 19 respectively of the first amplifier stage are connected directly to points 3 and 4, and, therefore to grids 7 and 8 of tubes 1 and 2, respectively. It will be noted that the resistors *r* of Figure 1 have been replaced by the plate-to-cathode impedances, $r_p$ of the respective tubes. The source of potential 11 now supplies the anode potentials of both stages of the emplifier.

It will be seen that a signal voltage, alternating or direct current, applied to terminals 16 and 17 of the first amplifier stage is amplified by tubes 18 and 19 and appears between points 3 and 4 as the input to tubes 1 and 2. This produces a voltage in the cathode-grid circuit of tubes 1 and 2 unbalancing the anode currents of these tubes with the result that a potential representing the signal input will be present between terminals 13′ and 14′. Thus a symmetrical balanced amplifier is provided in which the anodes of one amplifier stage are connected directly to the grids of the following stage and in which the critical adjustment of voltages and circuit parameters has been eliminated.

Under no-signal conditions equal plate currents will flow in tubes 18 and 19 with the result that the drop across each tube will be equal and of opposite sign and no difference in potential appears between points 3 and 4 and, consequently, at points 13 and 14. With a signal applied, however, the current in one of the tubes will increase while that on the other decreases to produce unlike voltage drops between points 3—20, and 4—20; this difference appears as a differential voltage between points 3 and 4. The voltage appearing between 3 and 4 will vary in magnitude and direction in accordance with signal inputs to tubes 18 and 19. Further, the voltage between points 3 and 4 is impressed between the cathode and grid of tubes 1 and 2 and is amplified.

While no bias has been included for the grids in the accompanying drawings for purposes of clarity, it will be apparent to those skilled in the art that suitable biasing means may be inserted to provide the necessary biasing potentials.

Figure 3:
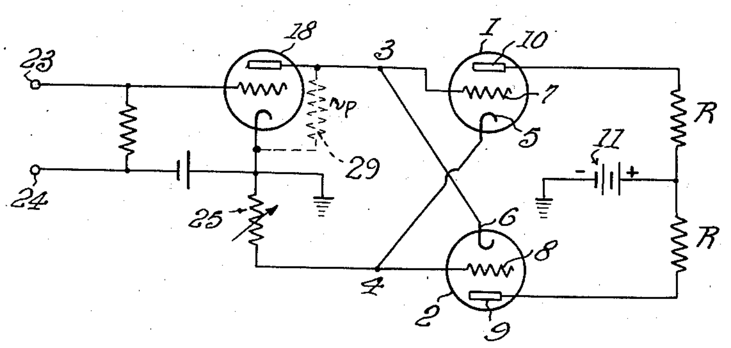
Figure 3 shows an alternate amplifier circuit according to the present invention.

In Figure 3 is shown a modification of the amplifier of Figure 2 in which only one tube is used in the first stage. This arrangement provides an effective and convenient coupling means between an unbalanced stage comprising tube 18 and a balanced stage comprising tubes 1 and 2. The tube 19 of Figure 2 has been replaced by resistive element 25 which is adjusted so that its resistance is equal to the cathode-to-anode impedance of tube 18 under no-signal conditions. The cathode-to-anode impedance is represented on the drawings by the dotted impedance symbol, $r_p$, and the reference numeral 29. It will be apparent that the conditions existing in Figure 2 are substantially met by the arrangement of Figure 3. Points 3 and 4 will be equal amounts positive with respect to point 20 and input to tubes 1 and 2 will be that required for push pull operation.

Figure 4:
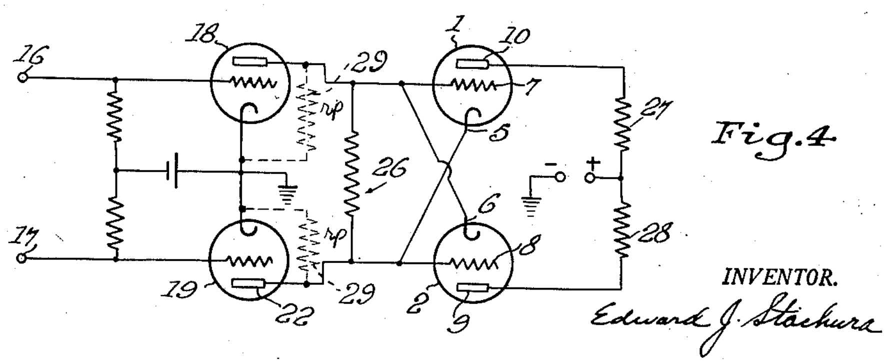
Figure 4 shows still another modification of an amplifier according to the invention.

Referring now to Figure 4, there is shown a further modification of the amplifier of Figure 2 wherein the load or output circuit connected between the anodes 9 and 10 of tubes 1 and 2. If the load, which may be represented by impedance element 26 is connected between the anodes of tubes 18 and 19, the impedance elements may be omitted if so desired. Other conditions of operation are similar to those of Figures 1, 2, and 3. It will be apparent from the foregoing description of Figures 1, 2, and 3 that a variation in current through tubes 18 and 19 under signal inputs will provide variations in voltage drops across tubes 18 and 19 and, therefore, a voltage differential across output element 26.

It will be apparent to those skilled in the art that the tubes of the first stage in Figures 2, 3, and 4 may be one type and tubes used in the push pull output stage may be of another type.

While certain embodiments of the invention have been described by way of illustration, it will be understood that the invention is not limited thereto and that various changes and modifications may be made without departing from the spirit and scope of the invention.

I claim:

1. In a multi-stage amplifier for amplifying direct or alternating currents, a first stage including at least one tube, an input circuit connected to the control grid of said one tube, and a second stage including a pair of tubes; means connecting the control grid of one of said pair of tubes to the cathode of the other of said pair of tubes, means connecting the control grid of the other of said pair of tubes to the cathode of the said one of said pair of tubes, a source of anode potential, means connecting the positive terminal of said source to the anodes of said pair of tubes; said one tube of said first stage having a no-signal cathode-to-anode impedance, means for connecting the anode of said first tube of said first stage to the grid of one of said pair of tubes and the cathode is connected to a terminal point, an impedance means equal in value to said cathode-to-anode impedance connected between said terminal point and the grid of the other of said pair of tubes, means for connecting the negative terminal of said source to said terminal, whereby said first stage is coupled directly to said second stage and wherein all anodes receive potential from said source of potential.

2. In an amplifier comprising a first pair of tubes, an input circuit connected to the control grids of said first pair of tubes, and a second pair of tubes, means connecting the anode of one of said first pair of tubes to the grid of one of said second pair of tubes and to the cathode of the other of said second pair of tubes, means connecting the anode of the other of said first pair of tubes to the grid of the other of said second pair of tubes and to the cathode of said one of said second pair of tubes, a source of anode potential, means connecting the positive terminal of said source to the anodes of said second pair of tubes, and means connecting the negative terminal of said source to the cathodes of said first pair of tubes.

3. An amplifier comprising a first stage including at least one tube, an input circuit connected to the control grid of said one tube, and a second stage including a pair of tubes having their anodes connected in opposition, said one tube having a no-signal cathode-to-anode impedance, means for connecting the anode of said one tube to the grid of one of said pair of tubes and the cathode to a terminal point, an impedance means equal to said cathode to anode impedance connected between the grid of the other of said pair of tubes and said terminal point, means for connecting the grid of said one of said pair of tubes to the cathode of the other of said pair of tubes, and means connecting the grid of said other of said pair of tubes to the cathode of said one of said pair of tubes; a source of anode potential, means for connecting the positive terminal of said source to the anodes of said pair of tubes and the negative terminal of said source to said terminal point.

4. In a multistage amplifier for amplifying direct or alternating currents, a first stage including one tube, an input circuit connected to the control grid of said one tube, and a second stage including a pair of tubes; means connecting the control grid of one of said pair of tubes to the cathode of the other of said pair of tubes, means connecting the control grid of the other of said pair of tubes to the cathode of the said one of said pair of tubes; a source of potential, means connecting the positive terminal of said source to the anodes of said pair of tubes; said one tube of said first stage having a no-signal cathode-to-anode impedance, means connecting the anode of said first tube of said first stage to the grid of one of said pair of tubes and the cathode to a terminal point, an impedance means equal in value to said cathode-to-anode impedance connected between said terminal point, and the grid of the other of said pair of tubes, means for connecting the negative terminal of said source to said terminal, whereby said first stage is coupled directly to said second stage and wherein all anodes receive potential from said source of potential.

5. A multistage amplifier in accordance with claim 4 wherein said impedance means comprises a resistor.

6. A multistage amplifier in accordance with claim 4 wherein said impedance means comprises the cathode-to-anode impedance of a vacuum tube.

References Cited in the file of this patent

UNITED STATES PATENTS

| | | |
|---|---|---|
| 2,383,351 | Smith | Aug. 21, 1945 |
| 2,428,295 | Scantlebury | Sept. 30, 1947 |

(Other references on following page)

UNITED STATES PATENTS

| | | |
|---|---|---|
| 2,455,718 | Weller | Dec. 7, 1948 |
| 2,509,389 | Blake | May 30, 1950 |
| 2,523,240 | Vackar | Sept. 19, 1950 |
| 2,531,458 | Nye | Nov. 28, 1950 |

FOREIGN PATENTS

| | | |
|---|---|---|
| 678,546 | Germany | July 18, 1939 |

| | | |
|---|---|---|
| 542,035 | Great Britain | Dec. 23, 1941 |
| 984,473 | France | Feb. 28, 1951 |

OTHER REFERENCES

RCA Review, vol. XII, Issue 1, March 1951, pages 5, 6. "Use of New Low-Noise Twin Triode in Television Tuners," by R. M. Cohen, Figure 1C.